Oct. 11, 1960    R. B. WAY ET AL    2,955,567
AUTOMATIC PAINTING MACHINE
Filed May 11, 1953    6 Sheets-Sheet 1
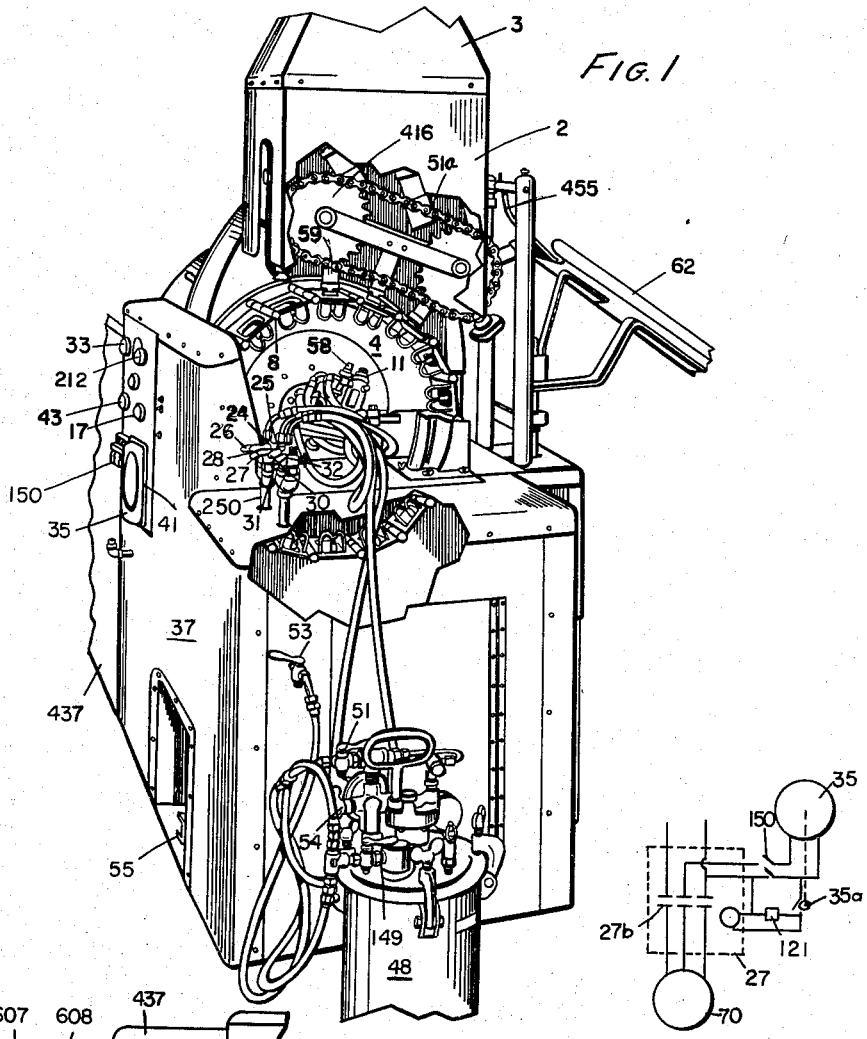
FIG. 1
FIG. 16
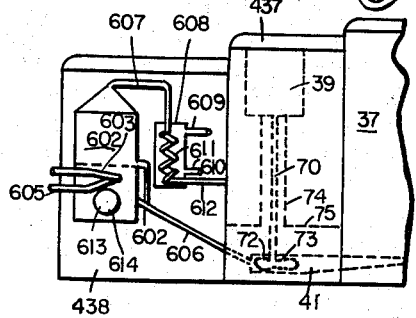
FIG. 13
INVENTORS
ROBERT B. WAY
CARL D. HERSEY
BY
Charles L. Losenkeek
attorney Oct. 11, 1960    R. B. WAY ET AL    2,955,567
AUTOMATIC PAINTING MACHINE
Filed May 11, 1953    6 Sheets-Sheet 3

Inventors
Robert B. Way
By Carl D. Hersey
Charles L. Lovercheck
Attorney

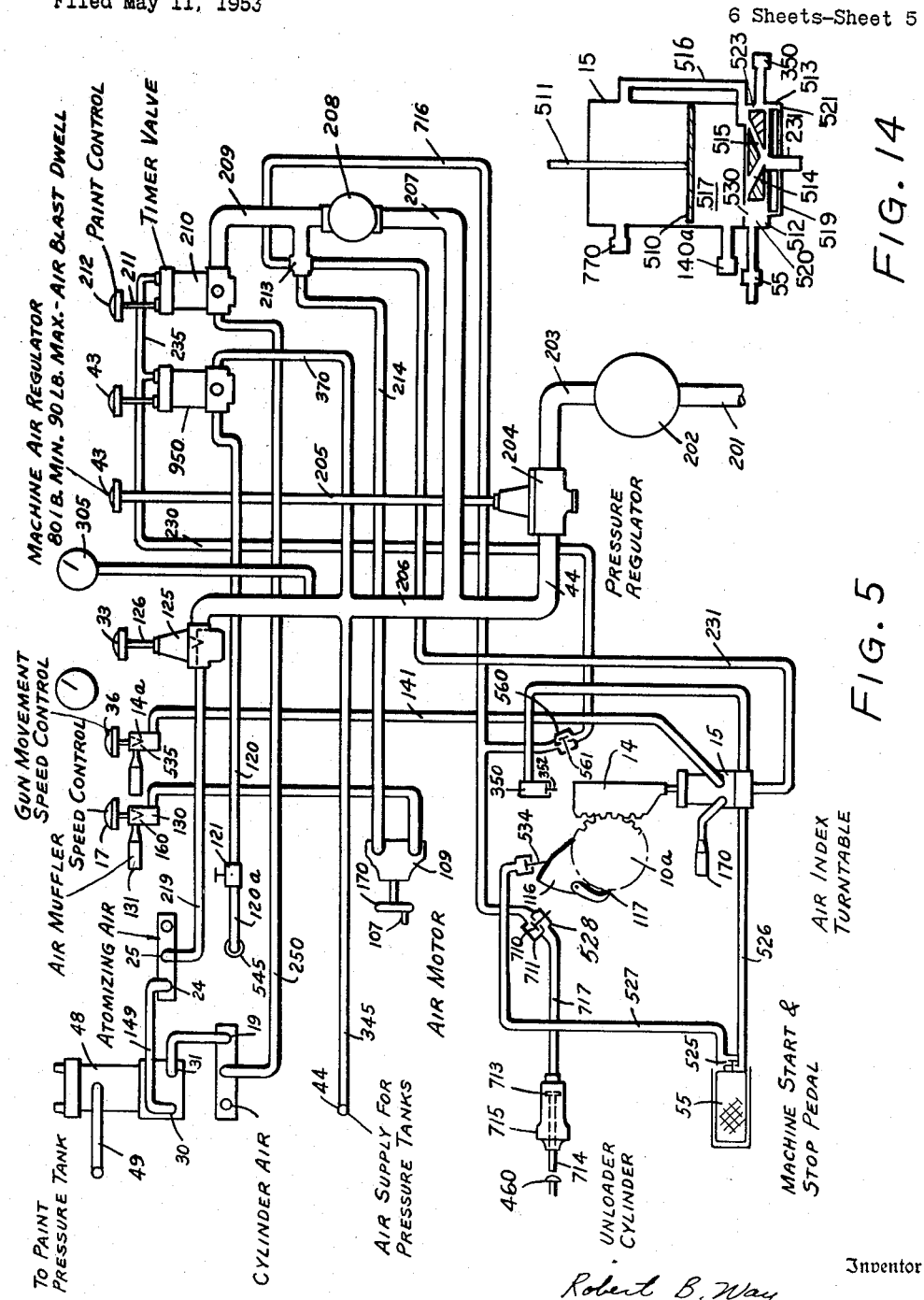

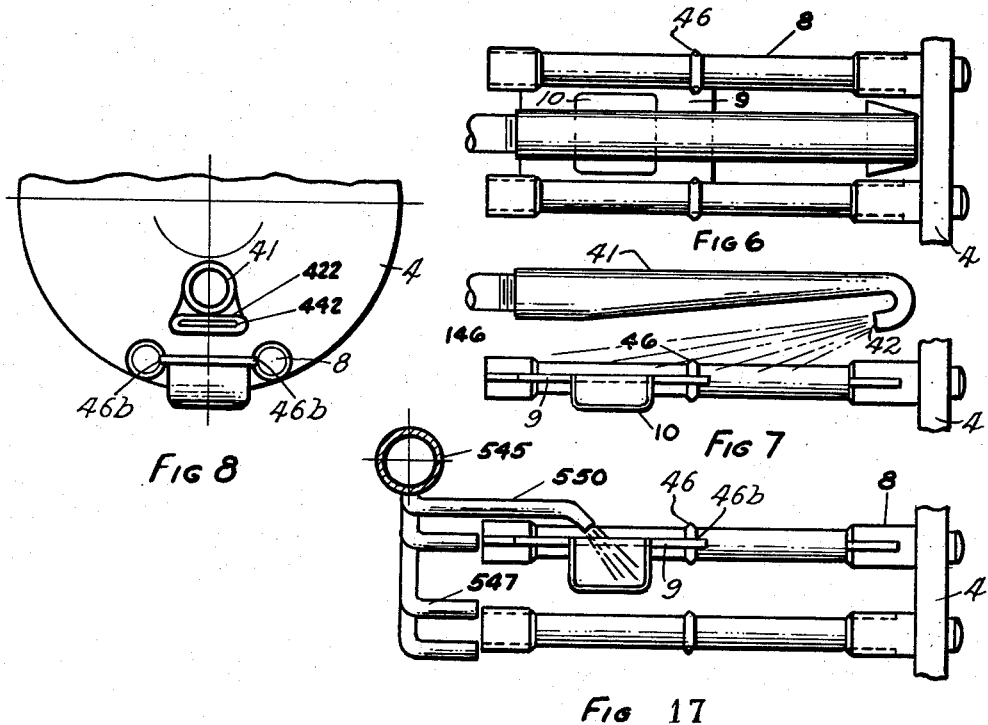
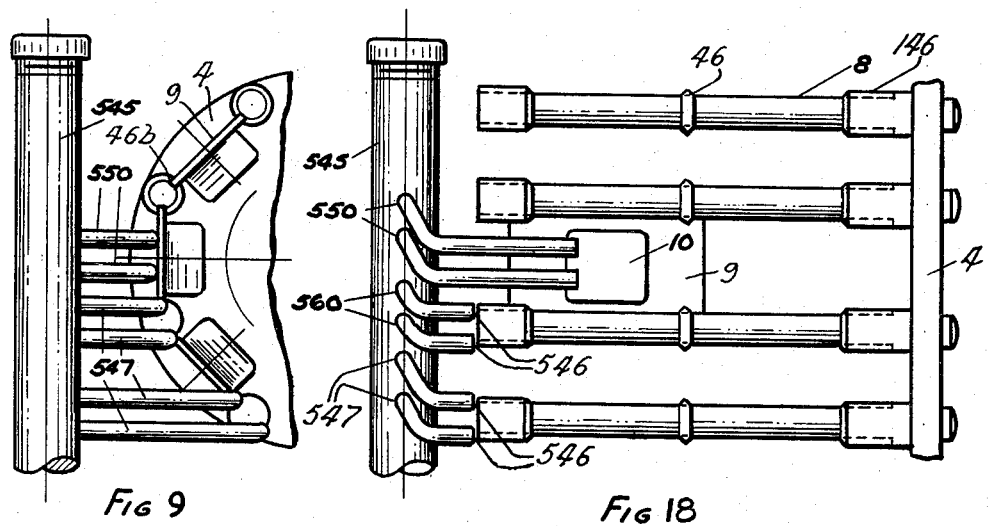

United States Patent Office 2,955,567
Patented Oct. 11, 1960

2,955,567

AUTOMATIC PAINTING MACHINE

Robert B. Way, 1503 Chelsea Ave., and Carl D. Hersey, 3107 Marvin Ave., Erie, Pa.

Filed May 11, 1953, Ser. No. 354,208

11 Claims. (Cl. 118—301)

This invention relates to painting machines and more particularly to machines for simultaneously painting a plurality of colors on a device such as a toy, an automobile medallion, name plate, clock dials, military brushes, statuettes, refrigerator door emblems, interior decoration, and other articles of manufacture.

Automatic painting machines, made according to prior designs and with which we are familiar, have certain disadvantages in their operation in that excess paint is inclined to accumulate on the surface of the masks or stencils which protect certain parts of the articles from being painted and this paint is inclined to inadvertently be deposited on the parts of subsequent articles of manufacture which were not intended to be painted. Consequently, the machines had to be shut down while the masks were removed, cleaned, and replaced.

It is, accordingly, an object of our invention to overcome the above and other defects in prior painting devices and more particularly to provide an automatic painting machine which will simultaneously spray a plurality of different colors on separate parts of the same article of manufacture.

Another object of the invention is to provide a painting machine having a continuously rotating drum for supporting paint masks.

Another object of our invention is to provide a novel means for periodically washing the excess paint from paint masks between various painting cycles in an automatic paint machine without interrupting the continuous operation of the machine.

Another object of the invention is to provide a means for washing and drying paint masks in an automatic painting machine between various painting cycles without interrupting the production of the machine.

Another object of the invention is to provide a novel combination of a rotating or otherwise moving mask carrying drum or conveyor in an automatic painting machine in combination with a means for oscillating or moving the paint guns during the painting operation.

Another object of the invention is to provide a novel control means for controlling the speed of oscillation of paint guns, the interval during which the paint guns are spraying paint on the work, and the time in which the paint is sprayed.

Another object of the invention is to provide a novel means for controlling the cycle of operation of mask washing and drying in an automatic paint machine whereby the masks may be washed once on every revolution of the mask carrier or washed on alternate revolutions of the mask carrier.

Another object of the invention is to provide an automatic painting machine wherein the paint guns move in a manner simulating the manner in which a hand spray painting device is moved by a painter.

Another object of the invention is to provide an automatic painting machine having a loading device with a speed readily adjustable.

A further object of the invention is to provide a painting machine wherein the paint masks may be washed on alternate painting cycles to conserve solvent.

A further object of the invention is to provide an automatic painting machine wherein two or more colors may be painted in the same painting cycle.

Another object of the invention is to provide a painting machine wherein the time the paint guns are spraying and the speed and amplitude of movement of the paint guns during painting are readily adjustable.

Another object of the invention is to provide an automatic painting machine wherein three or more masks or stencils are used to hold the article being painted in the machine and the masks or stencils separate the colors as they are being sprayed.

Another object of the invention is to provide an automatic multicolor paint machine wherein the excess paint is removed from the mask or stencil by use of a paint solvent after the part has been removed therefrom and the excess solvent is removed by means of a blast of air without interrupting the operation of the machine.

A further object of the invention is to provide an unloading device in an automatic painting machine wherein the article being painted is held in place by pressure on the part by the unloader and the unloader also removes the article from the stencil or mask.

With the above and other objects in view, the present invention consists of the combination and arrangement of parts hereinafter more fully described, illustrated in the accompanying drawings, and more particularly pointed out in the appended claims, it being understood that changes may be made in the form, size, proportions, and minor details of construction without departing from the spirit or sacrificing any of the advantages of the invention.

In the drawings:

Fig. 1 is an end view of our novel painting machine;

Fig. 5 is a diagram of the air piping and associated equipment used in the machine;

Fig. 6 is an enlarged detailed view of a mask disposed in a mask carrier of the machine;

Fig. 7 is an enlarged view showing the solvent jet and air blast used with the machine;

Fig. 8 is an end view of the device shown in Fig. 7;

Fig. 9 is an end view of the mask washing mechanism and the mask carrying drum shown in Fig. 18;

Fig. 13 is a view of the distilling device;

Fig. 14 is an enlarged view of the main drive cylinder of our novel machine;

Fig. 16 is a wiring diagram of our machine;

Fig. 17 is another view of the air jets showing their relation to a mask in the mask carrier of our machine;

Fig. 18 is a view similar to Fig. 17 taken at right angles to the direction of the view in Fig. 17.

Figure 2:
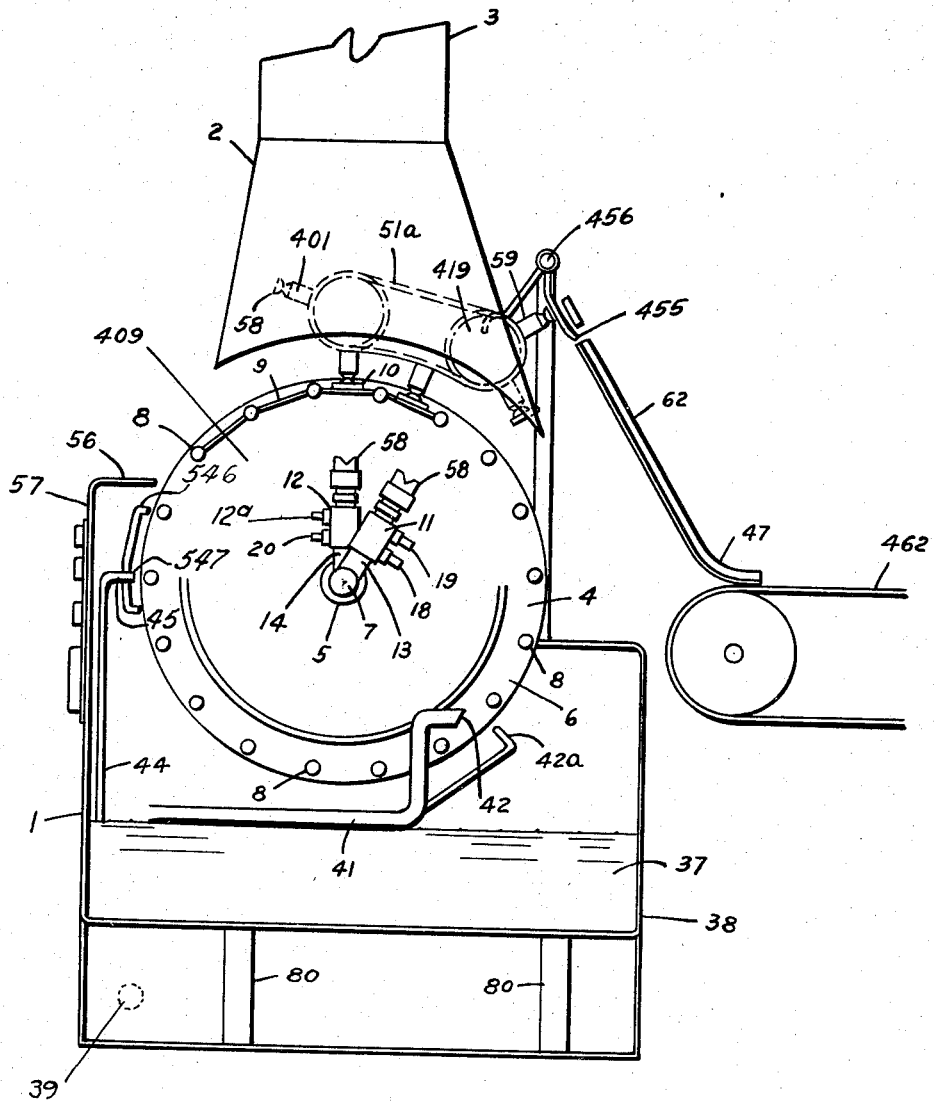
Fig. 2 is a cross sectional view taken on line 2—2 of Fig. 1.

Now with more detailed reference to the drawings, in Fig. 1, we disclose an automatic painting machine 1 having a hood 2 disposed thereover which may be connected to an exhaust system at 3 to prevent paint fumes from escaping into the factory room or other enclosure. The paint mask supporting drum or carrier 4 is pivotally mounted on the paint machine 1 by a tubular axle shaft 5 which is driven in a clockwise direction by means of the air cylinder 15.

The drum 4 is preferably made up of a large disk 6 which is mounted on the tubular shaft 5 and has the axially extending bars 8 attached to the disk 6 at spaced locations. Mask or stencil supporting members 9 are supported between the bars 8 for supporting a toy, brush back, or other article of manufacture in a mask 10. The masks shown are designed for supporting brush backs which are rectangular in shape.

The mask supporting members 9 are plate shaped as shown in Figs. 6, 7, 9, 17, and 18 and may be described as "shuttle plates" since the masks supported in the support plates are swung or shuttled from the paint application area adjacent the nozzles 58 of the paint guns 11 and 12 (Fig. 2) when a particular mask is at the top of its shuttling path to a position at the bottom of its shuttling path in the cleansing area adjacent nozzles 42 and 42a.

Each plate or mask support has a relieved edged opening for receiving one of the masks 10 which are form fitting; that is, they conform in shape to the shape of the exposed side of the article to be painted, this being a brush in the exemplary illustration. The masks 10 are held in the opening by any suitable fastening means; for example, they could be held by soldering, brazing, or welding or they could be pressed into the opening in the plate or supporting member 9.

The above support means could be referred to generically as latch means.

In actual operation, a mask support 9 will preferably be supported between each bar 8 and each adjacent bar and can be slid out of the supporting spaced slats 46b in the enlarged ring members 46 and replaced by masks suitable for painting a different article when all articles of one kind have been painted.

Paint guns 11 and 12 are supported on shaft 7 which is disposed inside concentric tubular shaft 5. The paint guns 11 and 12 have base members 13 and 14, respectively, which are rigidly mounted on the shaft 7 and the crank 8a oscillates the paint guns 11 and 12 through connecting rod 9a. The shaft 7 is keyed to the connecting rod 107 by set screw 19a. The connecting rod 107 on the motor 109 has a pin 102 therein which engages slot 108 to oscillate shaft 7. The pin 102 is adjustable and can be inserted in any one of the holes 140 to move the effective center nearer or further from the center of shaft 7 to increase or decrease the amplitude of oscillation of shaft 7. Thus, as the motor 109 rotates the connecting rod 107 about the center of the motor shaft 170, the connecting rod 9a will rock, causing shaft 7 to oscillate and causing the guns 11 and 12 to move in an arcuate path simulating the movement of a paint gun in the hand of a person painting. The movement of the guns can be controlled by controlling the amplitude of oscillation of shaft 7 by controlling the hole where pin 102 is located, thereby giving the correct amount of movement to cause the spray of paint from the guns to clear obstructions such as projections on the mask and obtain the optimum paint coverage of the part being painted.

The carrier 4 is driven by the air cylinder 15 which has a plunger or piston 510 which moves the rack 14 in a reciprocating movement to rotatably oscillate the gear 114 on shaft 5. Gear 114 is freely pivoted on the axle shaft 5.

Fig. 14 is a schematic view of the cylinder. The cylinder 15 has the piston 510 slidably disposed therein and attached to the rod 511 and the rod 511 is attached to the rack 14. A valve chamber 512 is disposed at the lower end of the cylinder 15 and a cylindrical sliding valve 513 is slidably disposed therein. Slidable valve 513 has circumferential slots 514 and 515 which admit air from pipe 231 to the space above the piston or to the space 517 below the piston, depending on the position of valve 513. A tube 519 having a very small diameter opening communicates between pipe 231 and the space 520 at one end of the sliding valve 513. The tube 521 having a very small opening communicates between pipe 231 and the space 523 at the other end of the sliding valve 513.

Figure 11:
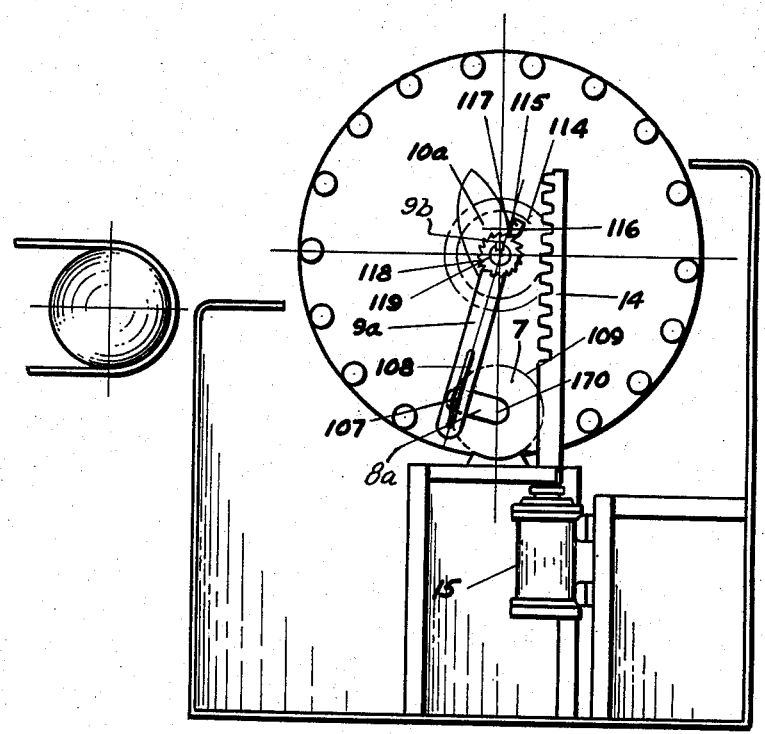
Fig. 11 is a rear view of the mask carrier drive mechanism.

It will be apparent that inasmuch as pipe 231 is connected to the main air supply from regulator 204, a constant pressure of, for instance, eighty pounds per square inch will be maintained therein. When the machine is stopped, cam 116 will be in engagement with valve stem 534, thereby holding valve 528 open, but valve pedal 55 will be closed and an equal pressure, that is, line pressure, will be maintained on both ends of the sliding valve 513. If the operator steps on pedal 55 to open the valve 525 therein, air will be allowed to flow through pipe 526 to pipe 527 and since the valve 528 is open, air will escape through the valve 528 and the pressure in spaces 520 will drop to atmospheric pressure and allow the sliding valve 513 to move to the left so that the groove 514 will communicate with pipe 231 and the aperture 530, allowing air to flow into the space 517 below the piston and, inasmuch as valve 140a is adjusted to allow the air to escape at a low velocity, the pressure in space 517 will build up under the piston 510 and drive the piston upward, moving the rack 814 upward and causing the gear 10a to rotate the pawl 115 to rotate the ratchet gear and, therefore, rotate the shaft 5 and the mask carriers supported thereon to move the mask carrier ahead one mask position. The piston 510, rack 814, gear 10a, and associated equipment comprise intermittently acting shifting means to rotate the cylinder and, thus, to move the shuttle plates or mask support plates 9 from the application area adjacent the spray gun nozzles 58 to the cleansing area adjacent solvent nozzles 42 and 42a. As the rack 14, Fig. 11, moves up to the upper limit of its stroke, the end of the rack strikes the stem 352 of the limit valve 350. The stem 352 of the limit valve will be pushed upward and allow air to escape from the valve 350 and since the cam 116 has been rotated with gear 10a out of engagement with the valve stem 534 of the valve 528, valve 528 will be closed. Then air from pipe 231 will flow through the small opening in pipe 519 and the air in the space 520 at one end of the cylindrical valve 513 will build up to approximately line pressure; that is, about eighty pounds per square inch which is the pressure in pipe 231. Since the rack 14 is holding the valve stem 352 of the valve 350 open, the pressure of the air in the space 523 will drop to approximately atmospheric pressure. The pressure which is now built up at the space 520 will react to force the cylindrical valve member 513 to the right, causing the slot 515 to communicate with the pipe 231 and the passage 516, thereby allowing air at line pressure to flow through the slot 515 into the passage 516 into the space above the piston 510 and to drive the piston downward. The air below the piston in the space 517 will be exhausted through the throttling valve 140a which may be adjusted by means of the throttling needle 535 to allow the air to escape at a lower rate of speed. By adjusting the valve needle 535 to control the rate of escape of air from below the piston 510, the rate of descent of the piston will be controlled. The valve needle 535 therefore comprises means for selectively varying the timing operation of the shifting means on the piston 510 for shifting the plates 9.

During the time that the piston is returning to the bottom of its stroke, the operator will have time to load another article to be painted into the mask in the machine. The time that is allowed for the descent of the piston determines the rate of operation of the machine. When the piston 510 reaches the bottom of its stroke and the rack 14 has moved out of engagement with the valve stem 352 and this valve has closed, the pressure in the space 523 in the rod of the piston has begun to build up through the small tube 513 to approximately line pressure. As it increases, inasmuch as the gear 10a with the cam 533 attached thereto is again moved into engagement with the valve stem 534, the valve will be opened and pressure in space 520 will drop and pressure in the space 523 will be built up. The pressure in the passage 516 will thereby force the valve 513 to the left again and cause the slot 514 to communicate with the pipe 231 and also the space 517 so that the pressure therein drives the piston 510 upward. This operation of the piston is repeated until the operator decides to stop the machine by operating the foot pedal 55 to close the valve 525. This will maintain the pressure in the space 520 equal to the pressure in pipe 231 which will also be maintained in the space 523 so that the piston 510 will remain inoperative.

The paint solvent 37 is contained in tank 38 and is circulated by pump 39 through the pipe 41. The tank 38 is supported on legs 80. The flow of unlubricated air to blow the excess solvent off the mask is introduced through pipe 370 to timer 950 and from timer 950 through the pipe 120 which is controlled by the electrical valve 121 which is connected through pipe 120a to header 545 which connects to the air jets 546 and 547. The valve 121 is actuated from motor switch 150.

Figures 4, 15:
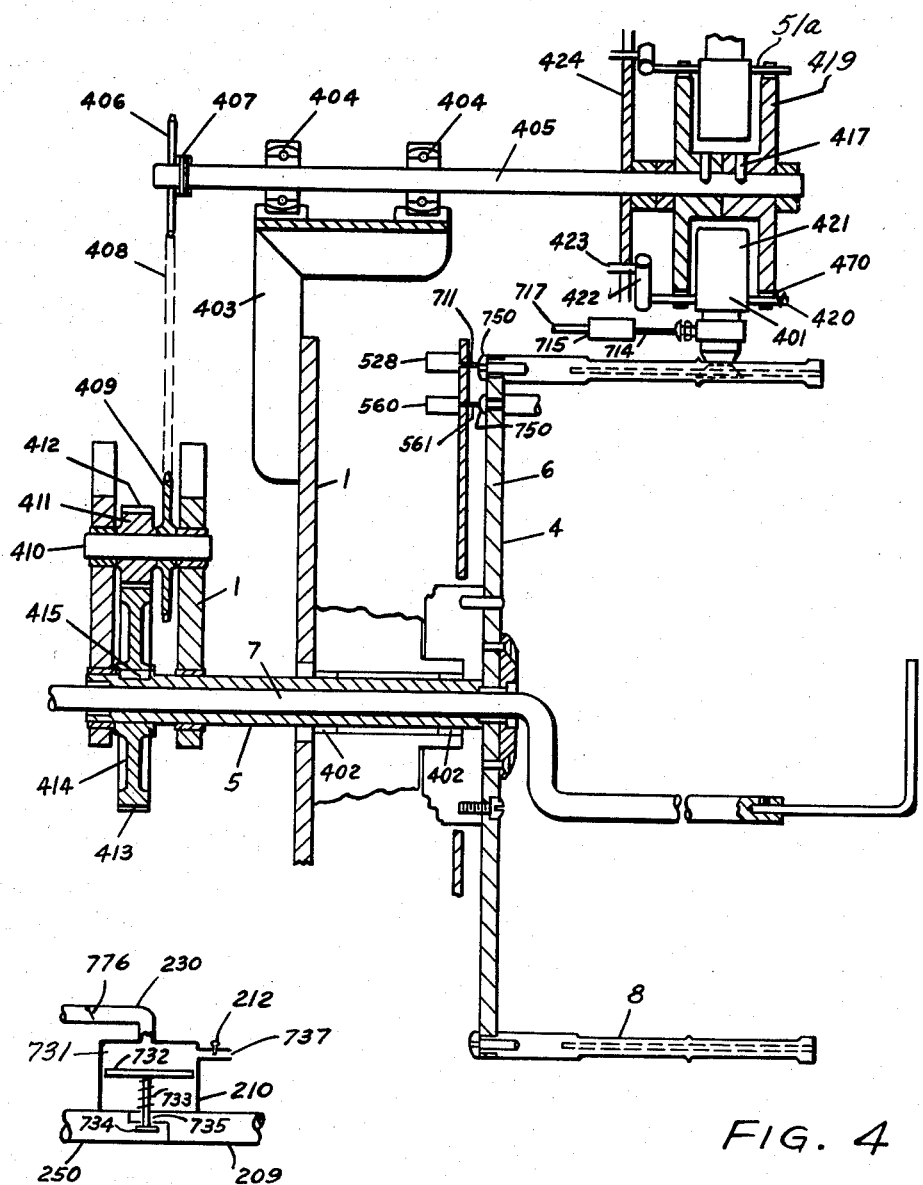
Fig. 4 is an enlarged cross sectional view of the mask carrier and gun actuating means of our machine.
Fig. 15 is an enlarged diagrammatic view of a timer valve.

A detailed view of timer valves 950 and 210 is shown in Fig. 15. When a cam 750 (Fig. 4) on mask carrier 4 strikes valve stem 561, it opens it, allowing air to flow from pipe 716 to pipe 230 and into space 731 to force piston 732 downward against the force of spring 733 to open valve 734 and allow air to flow from pipe 209 to pipe 250 to blow the excess solvent off the mask. As cam 750 moves off valve stem 561, the air trapped above piston 732 escapes at a controlled rate through adjustable orifice 737 wherein the rate of escape of the air is controlled by adjusting screw 738. Therefore, the length of time the air blast is on can be controlled by adjusting screw 738 to control the time required for piston 732 to move upward to close valve 734. Timer 950 is similar to timer 210 and determines the length of time lubricated air is applied to operate the guns through pipe 250.

The pump 39 runs at a constant rate and delivers fluid through the pipe 41 and the nozzle 442. The pump 39 has an explosion proof electrical motor 70. The motor 70 runs at a constant rate and has a shaft 71 attached thereto which drives the impeller 72. The impeller 72 is disposed in a suitable shroud and discharges fluid into duct 73. It will be noted that the bearing 74 of the pump 39 is disposed above the level 75 of the fluid in the tank so that the abrasive action of the paint will not affect the pump bearings. An electrical timer 35 is provided to turn the motor 70 on and off periodically when it is desired to wash the masks intermittently, and paint solvent is sprayed constantly from nozzles 42 and 42a when the motor 70 is running.

The solvent from the nozzle 42 is impinged upon the masks as shown in Fig. 7. The end of the pipe 41 is bent back on itself at 441 and it terminates in the nozzle 42 which directs a stream of solvent onto the mask support 9 at an angle of approximately forty-five degrees thereto in such manner that most paint is washed therefrom. The control valve 121 is actuated electrically by a circuit in parallel with motor 70. The pipe 41 is flattened to form a slot like opening 442 which gives a wide stream of solvent and it strikes the mask to wash the residual paint therefrom and to penetrate the slots 46b between the mask support 9 and bars 8.

As the mask carrier indexes forward to bring the mask supports into alignment with the air blast nozzle 45, the air from the pipe 120a which communicates with header 545 blows off and dries all residual solvent from the mask. The air therethrough is blasted onto the mask carriers and is directed into the slots 46 at 546 to blow all the residual paint solvent and paint suspended therein from the crevices and notches 46 and causes the solvent and paint to fall into the paint solvent sump 37. The tubes 550 direct compressed air into the article receiving opening in the mask. The jets 547 blow solvent out of the slots at two stations and the tubes 550 blow the solvent out of the article receiving aperture in the mask.

The paint washed from the masks by the solvent from the nozzle 42 falls into the sump 37 and if no care is taken to remove the paint from the solvent, it would soon accumulate and fill the tank 38 completely. To overcome this difficulty, the paint from the sump 37 flows through a passage into the compartment or sump 437 and is there stored in a large quantity. Adjacent to the sump 437, a distilling device 438 is disposed.

Fluid from the sump 437 is pumped through pipe 606 through trickle valve 606a into the tank 602 and steam coil 603 evaporates it. The evaporated solvent flows through pipe 607 through condenser 608 which has a cold water connection 609 and a cold water discharge connection 610. The cold water circulates through condenser 608 and condenses the vaporized solvent in coil 611 and the condensed solvent flows back to the sump 437 through pipe 612.

A clean-out plate 613 which is held to the side of the tank 602 by means of screws 614 is provided whereby the paint pigments and other low volatile matter that fall to the bottom of the tank 602 can be cleaned out. The residual paint from the distilling process may be salvaged or disposed of in any suitable way.

By providing the distilling device in combination with the automatic paint machine, the operation of the machine is entirely continuous and it is only necessary to add solvent from time to time to replace that lost by evaporation since all of the solvent containing paint can be reclaimed.

Fig. 5 shows a schematic air piping diagram of the machine. A compressed air supply is attached to pipe 201 and the air flows through filter 202 through pipe 203 to pressure regulator 204. The pressure regulator 204 is manually adjustable to vary the air by adjusting dial 43 which actuates pressure regulator 204 through control rod 205. The air pressure from the regulator 204 will be indicated on gauge 305 and is preferably regulated at eighty to one hundred pounds per square inch. Pipe 44 has two branches 206 and 207. Branch pipe 207 leads through lubricator 208 through pipe 209 to timer valve 210 and also to three way fitting 213. Valve 210 is shown in Fig. 15 and its operation and construction which are similar to that of valve 950 have been described above.

Air is supplied from lubricator 208 through pipe 213 through pipe 214 to air motor 109 to drive it at a constant speed. The speed of operation of motor 109 is controlled by the adjusting of valve 130 which air exhausts at atmospheric pressure through throttling control 160 and outlet 131 and the velocity of air through the outlet is controlled by dial 17 which may be rotated to set the needle 160 of the valve 130 at a predetermined position to regulate the motor speed.

The masks are washed automatically. In applications where it is not necessary to wash the masks each paint cycle in order to provide for a minimum of solvent evaporation, the machine may be adjusted to wash the masks after every other paint cycle or every second or third cycle, etc. The timer 35 is connected to turn off the solvent motor 70 and to shut off air blast by closing electrical valve 121 which is connected in parallel with the motor 70.

Pump 39 is driven at a constant rate and discharges fluid through the pipe 41 and out of the nozzle 42 so that each mask is washed as it passes the nozzle. The timer 35 is connected in an electrical circuit with the motor as shown in Fig. 16 so that when the switch 150 is closed and the motor is running constantly, the cam 35a of the timer 35 can be set to turn off the pump motor 70 and the solenoid valve 121 on every other revolution of the mask carrier or every third revolution or any other alternate number of revolutions desired so that the masks are washed only once every second, third, or other predetermined number of revolutions. The cam 35a rotates to interrupt the flow of current through the contactor 27a to cause the relay contacts 27b of the relay 27c to open. Actuating relay 27c is also turned off and on by means of the timer 35 so that when the motor 70 is stopped, the air blast which blows the residual solvent off of the masks will not be actuated to disturb the residual paint during the cycles when the masks are not being washed. Inasmuch as solvent is very volatile and evaporates rapidly when sprayed through the air and into the masks, by washing the masks no oftener than necessary, a considerable saving in solvent can be made. The masks are never handled manually during the painting operation; therefore, there is little chance of mask damage.

After the masks are sprayed with solvent by nozzle 42, some of the solvent drains off as they are rotated to a position adjacent the air jets 546. The air blasts from jets 547 strike each mask as it indexes into alignment therewith. The air nozzle 560 will strike the same masks as the mask receiving opening in the mask carrier advances one notch and nozzles 550 blow out the article. The air from the air motor 109 is throttled by the valve 130 controlled by the dial 17 to move the valve needle 160 to adjust the air flow therethrough so that by operating the dial 17 which operates valve needle 160, the lubricated air passes through the motor 109 from pipe 214 and, therefore, the speed of oscillation or movement of the gun can be controlled by controlling the velocity of exhaust air from valve 130.

The paint guns 11 and 12 can be of any conventional air actuated design actuated by air from pipe 250. Guns 11 and 12 receive unlubricated compressed air for atomizing through pipe 219 connected to cocks 24 and 25 which are preferably connected by resilient hoses to the nipples 18 and 20 and paint under pressure is supplied from a container 48 through a hose 149 to the nipple 19. Similarly, another color of paint may be supplied through a hose to the nipple 12a on gun 11a and an unlubricated compressed air supply for atomizing from cock 30 through a hose to the nipple 20. The guns are actuated by air from timer 210 through pipe 250.

The paint guns are actuated when air is introduced through pipe 250 when valve 560 is opened by engagement of its stem 561 with a cam 750 on carried 4 and air passes through pipe 230 and actuates valve 210 to allow air to flow through pipe 250 to guns 11 and 12. Atomizing air is fed to the gun 11 through the pipe 219 from throttle valve 125 and the nipple 19. Operating air is fed through pipe 250 to nipples 21 and 18 when the cam 533 strikes the stem 561 of valve 560 to allow air to exhaust therefrom and, therefore, actuate the guns. Thus, cam 533 striking stem 561 to actuate the paint guns upon each revolution or cycle of cam 533 and upon each index of the machine may be termed automatic means for causing cyclical operation of the paint applying means or guns. Throttle valve 125 is controlled by dial 33 through rod 126 to adjust the amount of atomizing air and, therefore, the amount of paint sprayed on each cycle or article. Individual shut off cocks 26, 27, and 28 control the operating air to the guns and by shutting off one of these cocks, the gun connected to the hose corresponding to this cock will be rendered inoperable.

The flow of atomizing air is controlled by the dial 33 which controls the valve 125 to control the velocity of air flow in the atomizing air line 219.

During operation, the masks 10 suitable for the particular job in question are mounted on the bars 8 on the indexing mask carrier 4 by slipping the mask 10 on the mask support 9 into the slots 46 at each loading station around the mask carrier. If multicolor painting is to be done, paint cylinders containing different colors of paint are attached to the gun 11 and the gun 12. Additional guns could be provided for additional paint colors. Then the operator will depress the foot valve control 55 to allow air to actuate the air piston 510 in cylinder 15 and the mask carrier will then jog around intermittently at a speed determined by the setting of the valve 140a which determines the rate of return of the piston 510. The operator will then set the gun oscillation control dial 17 so that the guns oscillate or move at the desired speed and the operator will set pins 102 on crank 8a so it moves the guns the proper distance to give the desired coverage of paint and to make certain that no part of the mask shields any part of the work that is desired to be painted. The timer 35 is adjusted to control the frequency of mask washing and drying and the atomizing air control valve 125 is adjusted by means of the dial 33 in order to insure the proper size of spray being maintained.

As aforesaid, the solvent spray and drying air blast can be adjusted by means of timer 35 so it will wash each mask once during each revolution of the carrier or so that it will wash each mask only once during every other or during every third revolution, etc. The intermittent mask washing enables a great saving of solvent to be made since only the amount of solvent necessary to keep the masks clean is sprayed and the evaporation rate of the solvent is proportional to the times it is sprayed.

The operator will be standing adjacent to side 57 and will load articles of manufacture into the mask as the loading stations pass by him as the mask carrier rotates. Paint will be directed from the paint nozzles 58 onto the work or article supported in mask supports 9 which is to be painted.

After the articles of manufacture have been sprayed with the appropriate colors of paint from the nozzles 58 of the paint gun, they are automatically removed from the mask carrier. The air cylinders 401 perform the dual function of holding the articles in place in the masks while they are being painted and of removing them from the masks and depositing them on a conveyor.

The mask carrier 4 is journalled on the frame of the paint machine by roller bearings 402 which engage the tubular shaft 5. The frame of the paint machine 1 extends upwardly and supports bracket 403 which carries ball bearings 404 thereon. Bearings 404 pivotally support the shaft 405. Shaft 405 is driven through sprocket 406 which is attached thereto by pin 407 and a chain 408 engages sprocket 409 which is journaled in the machine frame and is fixed to rotate with shaft 410. Shaft 410 has gear 411 fixed to rotate therewith and gear 411 has teeth 412 which engage teeth 413 and gear 414. Gear 414 is keyed to tubular shaft 5 by key 415. The two sprockets 416 are pinned to shaft 405 by pins 417 and have chains 51a received thereon and the chains or bands 51a extend around the idler sprockets 419. The chains 51a carry the unloading cylinders 401.

From the above description, it will be apparent that the movement of the unloading cylinders 401 synchonizes with rotation of the mask carrier 4. The unloading cylinders 401 are supported on pins 420 which pass through the links of the chain 51a and the upper ends of cylinders 421 of the unloading cylinders 401 move around between the sprockets 416. The pin 420 has crank pin 422 attached thereto and guide pin 423 is attached to crank pin 422 and guide pin 423 follows the contour of cam 424 to control the movement of the unloading cylinders 401. A coil spring 470 mounted on the pin 420 holds the pin 423 in engagement with the cam 424.

The air cylinders 401 are made up of a cylindrical carrying portion 430 having the guide member 431 telescopically slidable therein against the force of the helical spring 432 which engages the carrying portion 430 at 433 and engages the guide member 431 at 434. The piston 435 is slidable in cylinder 436 and is held in fixed relation with regard to the carrying portion 430 by the shaft 437a which passes through hole 438a in the guide member 431 and is attached to the supporting member at 439. The cylinder 436 is attached to the guiding member 431 at 440 and has a bleeder hole 447 formed therein. The resilient vacuum cup 442a is attached to the end of the cylinder 436 at 443 by means of the fastening member 444 which has a hole 445 therein which receives the bolt 446 which is held therein by nut 441a. A hole 448 is formed through the resilient vacuum cup 442a and communicates with the hole 449 in the bolt 446 so that the space under the surface 450 of the vacuum cup communicates with the space 451 in the cylinder 436. A valve 452 is disposed in an opening 453 in the member 444.

In operation, the mask carrier 4 is indexed in a step by step fashion by the air cylinder 15 as previously described. The air cylinders 401 being synchronized with the mask carrier 4 are timed with the mask carrier so that each air cylinder engages an article supported in a mask as they come together before the article reaches top dead center. As the mask carrier continues to rotate in synchronism with the rotation of the air cylinder, the effective distance between the mask and the supporting portion 430 of the air cylinder will decrease. This will cause the cylindrical portion 436 to push the guiding portion 431 into the supporting portion 430 against the force of the spring 432 and a resultant force from the spring 432 will be imposed by the vacuum cup 442a upon the article in the mask to hold it firmly in position in the mask during the painting operation.

Figures 3, 10, 12:
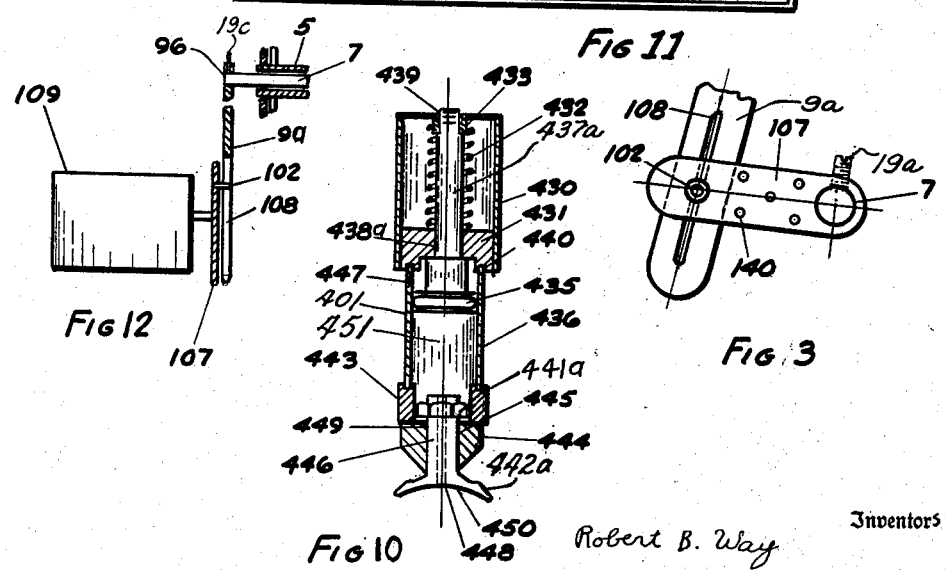
Fig. 3 is a detailed view of a portion of the paint gun oscillating means, which comprises a part of the invention.
Fig. 10 is a cross sectional view of an unloading cylinder of our machine.
Fig. 12 is another view of the gun oscillating means shown partly in cross section of our invention.

As the mask carrier continues to rotate forward, the air cylinder 401 shown in Figs. 4 and 10 will move away from the article of manufacture. The spring 432 will force the cylinder 436 outward, reducing the pressure in the space 451 and, therefore, causing the suction at the surface 450 which is in contact with the article. The bleeder hole 447 will prevent any pressure from building up between the piston 435 and the guiding member 431. The aforesaid suction will lift the article out of the mask and hold it to the vacuum cup 442a as the said air cylinder continues to rotate. The cylinder will move upward along with the chains 51a between the bifurcated member 455 which is pivoted to the machine frame at 456 and the bifurcated member 455 will engage the article as shown. At this point, the said air cylinder will have moved into the position 59 and at this position, the piston rod 714 of cylinder 715 will be in alignment with valve head 460. The cam 533 will engage valve stem 710 of valve 711 and cause air to flow from pipe 716 through pipe 717 and force piston 713 to drive piston rod 714 into engagement with valve head 460. This will open the valve 452 and allow air to flow into the space 451 to bring the pressure return up to near atmospheric and to reduce the pressure between the surface 450 and the article, thereby releasing the article and allowing it to slide, painted side up, down the chute 62 onto the conveyor 462. The conveyor will be of a length suitable to provide sufficient time for the paint on the article to dry before it is removed from the conveyor.

In the foregoing specification, we have set forth the invention in its preferred practical forms but we are aware that the structure shown is capable of modification within a range of equivalents without departing from the invention which is to be understood as broadly novel as is commensurate with the appended claims.

What we claim is:

1. Apparatus for applying coating compounds to articles, said apparatus having an application area and a cleansing area, a mask carrying plate, form fitting mask means on said plate, a support, said support being rotatable about a horizontal axis, said mask carrying plate being attached to said rotatable support, intermittently acting shifting means to rotate said support with said mask means thereon from said application area to said cleansing area below said application area and from said cleansing area to said application area, applying means for applying coating compounds to articles supported by said plate and within said mask means within said application area, fluid cleansing means for removing surplus coating compounds from said mask means while in said cleansing area, automatic means for causing cyclic operation of said applying means, and means for selectively varying the timing of operation of said shifting means, and means to direct air on said mask means when said mask means is moved from said cleansing area to remove excess cleaning fluid of said fluid cleansing means from said mask means.

2. Apparatus for applying paint to articles, said apparatus having a paint application area and a mask cleansing area, a mask carrying plate having at least one form fitting mask thereon to receive a part of a said article therein, intermittently acting shifting means for rotating said plate about a horizontal axis from said application area to said cleansing area below said application area and from said cleansing area to said application area, paint guns for applying paint to said articles supported by said mask when said mask is in said application area, paint solvent means in said cleansing area for removing excess paint from said mask, air means on said apparatus to remove excess said solvent means from said mask, and timer means to control said paint guns, shifting means, and air means.

3. Apparatus for applying coating compounds to articles, said apparatus having an application area and a cleansing area, a mask carrying plate having at least one relieved edged opening for receiving a form fitting, stencil like mask, means for securing said mask in said opening, intermittently acting shifting means for rotating said plate about a horizontal axis from said application area to said cleansing area below said application area and from said cleansing area to said application area, applying means for applying coating compounds to articles supported by said plate and upon said mask within said application area, cleansing means for removing surplus coating compounds from said mask and from said plate while in said cleansing area, automatic means for causing cyclical operation of said applying means, means for selectively varying the timing of operation of said shifting means, said cleansing means comprising means to direct cleaning fluid upon said mask, and means to remove residual solvent from said mask after said mask is moved from said cleansing area, said cleansing means being operable on each mask each time a mask passes said cleansing means, said cleansing means being adjustable to operate only after each said mask passes it a plurality of times.

4. Apparatus for applying coating compounds to articles, said apparatus having an application area and a cleansing area, a mask carrying plate having at least one relieved edged opening for receiving a form fitting, stencil like mask, means for securing said mask in said opening, intermittently acting shifting means for rotating said plate about a horizontal axis from said application area to said cleansing area below said application area and from said cleansing area to said application area, applying means for applying coating compounds to articles supported by said plate and upon the mask within said application area, cleansing means for removing surplus coating compounds from said mask and from said plate while in said cleansing area, automatic means for causing cyclical operation of said applying means, means for selectively varying the timing of operation of said shifting means, said apparatus having means thereon to hold articles in engagement with said mask while said articles are being coated, said holding means comprising spaced wheels, a band disposed around said wheels, a cylinder carried by said band, said cylinder having a telescopic member therein, a resilient member disposed on said telescopic member to engage said articles, means to cause said cylinder to telescope against the force of a member therein when said resilient member engages one said article.

5. The apparatus recited in claim 4 wherein said resilient member has a suction cup means thereon for engaging said articles.

6. The apparatus recited in claim 5 wherein means comprising a cam and a valve actuated by said cam is connected to said suction cup means to release the suction in said cup means to release articles held thereby.

7. Apparatus for applying coating compounds to articles, said apparatus having an application area and a cleansing area, a mask carrying plate having at least one relieved edged opening for receiving a form fitting, stencil like mask, means for securing said mask in said opening, intermittently acting shifting means for rotating said plate about a horizontal axis from said application area to said cleansing area below said application area and from said cleansing area to said application area, applying means for applying coating compounds to articles supported by said plate and upon the mask within said application area, cleansing means for removing surplus coating compounds from said mask and from said plate while in said cleansing area, automatic means for causing cyclical operation of said applying means, means for selectively varying the timing of operation of said shifting means, means to hold said articles in said mask, said holding means comprising a suction cup adapted to engage said articles to create a suction therein, and means to reduce said suction to release said articles.

8. Apparatus for applying coating compounds to articles, said apparatus having an application area and a cleansing area, a mask carrying plate having at least one relieved edged opening for receiving a form fitting, stencil like mask, means for securing said mask on said plate in said opening, intermittently acting shifting means for rotating said plate about a horizontal axis from said application area to said cleansing area below said application area and from said cleansing area to said application area, applying means for applying coating compounds to articles supported by said plate and upon the mask within said application area, cleansing means for removing surplus coating compounds from said mask and from said plate while in said cleansing area, automatic means for causing cyclical operation of said applying means, means for selectively varying the timing of operation of said shifting means, said shifting means comprising a rotatable member, spaced parallel rods on said apparatus, said rods extending parallel to the axis of rotation of said rotatable member, opposed parallel slots in said rods, said slots in said rods receiving the edges of said plate, the dimension of said slots corresponding to the thickness of said plate being greater than the thickness of said plate whereby a space is provided between the edges of said plate and the edges of said slots.

9. Apparatus for applying coating compounds to articles, said apparatus having an application area and a cleansing area, a mask carrying plate having at least one relieved edged opening for receiving a form fitting, stencil like mask, means for securing the mask in said opening, intermittently acting shifting means for rotating said plate about a horizontal axis from said application area to said cleansing area below said application area and from said cleansing area to said application area, applying means for applying coating compounds to articles supported by said plate and upon the mask within said application area, cleansing means for removing surplus coating compounds from said mask and from said plate while in said cleansing area, automatic means for causing cyclical operation of said applying means, means for selectively varying the timing of operation of said shifting means, said plate being supported on a rotatable plate by means of rods extending perpendicular to said rotatable plate and attached thereto, said rotatable plate being supported on a tubular shaft, an inner shaft extending through said tubular shaft, said applying means comprising a paint gun mounted on said inner shaft and disposed to direct a paint spray on said mask and articles as they are carried past said gun by said mask carrying plate, means to oscillate said inner shaft to move said paint gun in a manner generally simulating the movement of the hand of a hand painter, and means to rotate said tubular shaft.

10. Apparatus for applying coating compounds to articles, said apparatus having an application area and a cleansing area, a mask carrying plate having at least one relieved edged opening for receiving a form fitting, stencil like mask, means for securing said mask in said opening, intermittently acting shifting means for rotating said plate about a horizontal axis from said application area to said cleansing area below said application area and from said cleansing area to said application area, applying means for applying coating compounds to articles supported by said plate and upon said mask within said application area, cleansing means for removing surplus coating compounds from said mask and from said plate while in said cleansing area, automatic means for causing cyclical operation of said applying means, means for selectively varying the timing of operation of said shifting means, means to hold said articles in said mask, said plate being supported on a rotatable plate by means of rods extending perpendicular to said rotatable plate and attached thereto, said rotatable plate being supported on a tubular shaft, an inner shaft extending through said tubular shaft, said applying means comprising a paint gun mounted on said inner shaft and disposed to direct a paint spray on said mask and articles as they are carried past said gun by said mask carrying plate, means to oscillate said inner shaft to move said paint gun in a manner generally simulating the movement of the hand of a hand painter, and means to rotate said tubular shaft, said holding means being actuatable to remove said articles from said mask and to deposit them on a receiving means.

11. Apparatus for applying coating compounds to articles, said apparatus having an application area and a cleansing area, a mask carrying plate having at least one relieved edged opening for receiving a form fitting, stencil like mask, means for securing said mask in said opening, intermittently acting shifting means for rotating said plate about a horizontal axis from said application area to said cleansing area below said application area and from said cleansing area to said application area, applying means for applying coating compounds to articles supported by said plate and upon the mask within said application area, cleansing means for removing surplus coating compounds from said mask and from said plate while in said cleansing area, automatic means for causing cyclical operation of said applying means, means for selectively varying the timing of operation of said shifting means, said means to move said plate comprising an air cylinder having means to move said plate intermittently for rotating said plate, a throttling valve to control the flow of air from said air cylinder to control the frequency of intermittent plate movements, said applying means comprising a paint gun, an air motor attached to a shaft to oscillate said paint gun whereby paint is evenly distributed over articles supported in said mask, a throttling valve to control the flow of air from said air motor to control the speed of oscillation of said plate, means to direct paint solvent on said mask after the article has been removed, means movable with said plate actuating valves to allow air to flow to actuate said paint gun to spray paint on said article and to direct air through a pipe onto said mask at a point in the path of rotation of said plate spaced from said solvent means, and a timer to cause said solvent means and said air flow in said pipe to be inoperative during alternate revolutions of said plate.

References Cited in the file of this patent

UNITED STATES PATENTS

| Number | Name | Date |
|---|---|---|
| 92,633 | Morse | July 13, 1869 |
| 705,085 | Hormby | July 22, 1902 |
| 1,508,669 | Rabezzona | Sept. 16, 1924 |
| 1,580,671 | Nichols | Apr. 13, 1926 |
| 1,707,497 | Shevlin | Apr. 2, 1929 |
| 1,903,555 | Robertson | Apr. 11, 1933 |
| 2,169,114 | Sieb | Aug. 8, 1939 |
| 2,264,703 | Lenz | Dec. 2, 1941 |
| 2,327,668 | Rempel | Aug. 24, 1943 |
| 2,339,008 | Gladfelter et al. | Jan. 11, 1944 |
| 2,342,375 | Shurley | Feb. 22, 1944 |
| 2,358,258 | Schweitzer | Sept. 12, 1944 |
| 2,359,433 | McNamara | Oct. 3, 1944 |
| 2,383,023 | Sykes et al. | Aug. 21, 1945 |
| 2,412,139 | Fink | Dec. 3, 1946 |
| 2,426,391 | Emerson | Aug. 26, 1947 |
| 2,505,063 | Palmermo | Apr. 25, 1950 |
| 2,515,359 | Steiner | July 18, 1950 |
| 2,537,660 | Eldred | Jan. 9, 1951 |
| 2,547,884 | Paasche | Apr. 3, 1951 |
| 2,554,803 | Wysocki | May 29, 1951 |
| 2,636,391 | Carter | Apr. 28, 1953 |
| 2,665,013 | Socke | Jan. 5, 1954 |
| 2,700,929 | Williams | Feb. 1, 1955 |